United States Patent [19]

Perez

[11] Patent Number: 4,527,728

[45] Date of Patent: Jul. 9, 1985

[54] TOOL FOR SCARIFYING CONCRETE

[76] Inventor: Robert Perez, Santa Clara, Calif.

[21] Appl. No.: 574,334

[22] Filed: Jan. 27, 1984

Related U.S. Application Data

[60] Division of Ser. No. 472,630, Mar. 7, 1983, Pat. No. 4,451,093, which is a continuation of Ser. No. 215,055, Dec. 10, 1980, abandoned.

[51] Int. Cl.[3] .................. B23K 1/04

[52] U.S. Cl. .................. 228/119; 407/113

[58] Field of Search .................. 228/119; 407/32, 113

[56] References Cited

U.S. PATENT DOCUMENTS

| | | | |
|---|---|---|---|
| 1,252,082 | 1/1918 | Bock | 125/41 |
| 1,995,060 | 3/1935 | Gray et al. | 299/88 |
| 3,160,945 | 12/1964 | Johnson | 407/113 X |
| 4,273,479 | 6/1981 | Raupp, Jr. et al. | 407/113 X |
| 4,413,765 | 11/1983 | Tracy | 228/119 |

*Primary Examiner*—Kenneth J. Ramsey
*Attorney, Agent, or Firm*—John J. Leavitt

[57] ABSTRACT

Presented is a tool adapted for use in rupturing the surface of smooth concrete so as to provide a roughened surface. This process is commonly known as "scarifying" concrete. The tool comprises a bit adapted to be mounted in a conventional roto-hammer or other type actuating mechanism that provides a reciprocating and/or rotating motion, the bit being provided with a multiplicity of carbide tips which are driven repeatedly into the concrete surface to effect scarifying thereof.

3 Claims, 11 Drawing Figures

TOOL FOR SCARIFYING CONCRETE

This is a division of application Ser. No. 472,630, filed Mar. 7, 1983, now U.S. Pat. No. 4,451,093, which is a continuation of application Ser. No. 215,055, filed Dec. 10, 1980, now abandoned.

BACKGROUND OF THE INVENTION

1. Field of the Invention

This invention relates to industrial tools, and particularly to a bit having carbide tips mounted at an angle for scarifying concrete.

2. Description of the Prior Art

It is believed the prior art related to this invention may be found in the following classes and sub-classes:

Class 125, sub-classes 6, 7, 40, 41
Class 299, sub-class 94
Class 175, sub-class 395
Class 173, sub-class 94
Class 404, sub-class 90
Class 30, sub-class 168

A search of the classes and sub-classes indicated above revealed the existence of U.S. Pat. Nos. 1,252,082; 1,995,060; 2,752,141; 3,403,443; and 3,675,973.

U.S. Pat. No. 1,252,082 discloses a cutting tool that utilizes four bits, each being square in cross section and having a pyramidal end. When the four bits are clustered together, the four pyramidal points form the cutting end of the tool. When the apex of the pyramid formed by each bit is worn down, the bits are re-sharpened on the outside surface and eventually rotated so as to expose a new surface. When the bits have been worn down from repeated use and repeated sharpening, then the bits are loosened in their holder and each is revolved through 180° so as to place the long bevel as it appears in FIG. 9 of the patent on the outside of the bit, into the position illustrated in FIG. 10 on the inside of the bit.

U.S. Pat. No. 1,995,060 relates to a stone channeling bit that utilizes a multiplicity of separate chisel points removably secured on the end of a holder.

U.S. Pat. No. 2,752,141 is directed to a structure adapted to be mounted on the front of a truck for the purpose of pulverizing pavement. The tool or bit 54 which does the pulverizing constitutes a truncated three-sided pyramid. The upper edges 58 and the lower edge 60 of the bit are disposed in mutually convergent relation, terminating at the smaller triangular front face 62 of the tool so that the lower edge 60 presents an upwardly inclined cutting surface.

U.S. Pat. No. 3,403,443 relates to a drill bit for shattering hard formations such as concrete. This tool is not used for scarifying but rather for the complete destruction of a hard formation such as concrete, and is provided with wedges 5 which follow the bit into the concrete to enlarge the opening formed by the bit.

U.S. Pat. No. 3,675,973 relates to a concrete breaker tool the working surface of which is provided with three hexagonal breaking bars or points 20, 21 and 22. The inventive concept of this patent appears to be that the center hexagonal breaking bar 21 is longer than the breaking bars 20 and 22, thus penetrating the concrete surface first. Penetration of the center breaker bar first is alleged to weaken the concrete on opposite sides, with the two side breaker bars 20 and 22 thus encountering a weakened surface to effectively break the concrete.

As is well known, concrete constitutes a mixture of Portland cement and aggregate, the aggregate including various sized pebbles and a quantity of sand. With the addition of water, a thick plastic mass is formed which with time hardens into concrete as we know it and see it in use for pavements and for construction of various types. For many different reasons, a layer of concrete frequently develops cracks. Sometimes cracks may form because of temperature cycling and differential rates of expansion and contraction between the concrete and adjacent structures. At other times, the concrete will crack because of externally imposed forces such as the pressure exerted by a root from an adjacent tree.

Whatever the reasons, such cracks permit the passage of water into the sub-base below the concrete and in some instances result in unevenness of paving, causing a sharp declevity, with the result that it provides a sharp edge over which an unsuspecting person might trip and fall and sustain physical injury, thus imposing liability on the owner of the concrete paving. Wherever such cracks occur, it is advantageous that they be repaired expeditiously and at low cost. Heretofore, an entire section or square of a concrete sidewalk had to be removed in order to repair such a crack. Accordingly, it is one of the objects of the present invention to provide a scarifier tool that may be applied to the concrete surface in close association to the crack to roughen such surface and to open the crack sufficiently to permit the application of a sealing compound to the surface of the concrete and a filler material in the crack, thus sealing the crack therein.

It sometimes happens that entire concrete surfaces are formed in such a way that they are exceedingly slippery when wet or when covered with other type liquids. In such instances, it is an advantage to roughen the entire surface either for purposes of increasing the traction on the surface by wheeled vehicles or by pedestrians, or for the purpose of applying a different type of coating on the concrete surface. For instance, it is well known that concrete formed from Portland cement and aggregate is not resistant to the effects of blood, such as in slaughter houses and butcher shops, and that epoxy concrete in which the binder constitutes a synthetic epoxy rather than Portland cement is much more resistant to the chemical effects of blood and other caustic chemicals. However, epoxy concrete cannot be applied over a smooth surface of Portland cement concrete without "scarifying" the surface of the Portland cement concrete to roughen the surface and provide an adequate mechanical bonding surface for the application of epoxy concrete. Accordingly, another object of the invention is the provision of a tool which may be mounted in a reciprocating and/or rotatable drive mechanism and which, when directed to the surface of Portland cement concrete, will effect a disintegration of the smooth top surface so as to expose the underlying rough aggregate without causing cracks in the main body of the concrete.

Conventional tools used for the purpose of scarifying concrete constitute a head that is reciprocable by some appropriate driving mechanism, the head being provided with a longitudinal axis along which it reciprocates, and with a plurality of axially extending carbide tips that are embedded in the head with the longitudinal axes of the carbide tips parallel to the longitudinal axis of the reciprocable head. Frequently, the elongated carbide tips are shaped on their exposed end into a cone-form so that the sharpened ends of the carbide tips bite into the concrete when applied thereto. It has been found that after only a few hours of use of such a conventional head to concrete, the cone-shaped carbide tips wear away, exposing a rounded end that is much less efficient for scarifying concrete than the original point. Obviously, as the conventional tool is continued to be used, the end of the carbide tip becomes worn to a greater degree, thus decreasing the efficiency of the operation as it progresses.

Accordingly, another object of the present invention is the provision of a tool in which the carbide tips are embedded in the head structure in such a way that a multiplicity of sharp edges are exposed to the concrete, thus increasing the efficiency of operation of the head when used for scarifying concrete.

Another object of the invention is the provision of a scarifying tool provided with carbide tip cutting members embedded in the head in such a way that the head may be reprocessed to utilize the same carbide tips in the same head but with different edges of the carbide tips exposed so as to lengthen the life of the tool and thus economize through the use of carbide cutting members for many more hours than is usually the case.

Another object of the invention is the provision of a tool that may be applied to conventional drive units, the tool including a head in which a multiplicity of carbide tips are embedded in a special way, and a shank having an internal bore adapted to receive the reciprocable shaft of a driving mechanism, with means being applied between the tool and the driving mechanism to retain the head on the reciprocable shaft during use.

The invention possesses other objects and features of advantage, some of which, with the foregoing, will be apparent from the following description and the drawings. It is to be understood, however, that the invention is not limited to the embodiment illustrated and described, since it may be embodied in various forms within the scope of the appended claims.

SUMMARY OF THE INVENTION

In terms of broad inclusion, in a preferred aspect, the scarifying tool of the invention comprises an elongated body formed generally symmetrically about a longitudinal axis and having a shank on one end provided with a bore adapted to receive the reciprocable shaft of a driving motor. At its opposite end the body flares out to provide a relatively broad head which preferably is cylindrical in its configuration, but which may also be rectangular or square. In the lower or working surface of such head there is embedded a multiplicity of carbide tips of elongated cylindrical configuration (or alternatively of rectangular or square bar stock), the carbide tips being embedded in the head portion of the tool in an inclined relationship with the longitudinal axis of each carbide tip inclined about 45° to the axis of the tool. A cylindrical carbide tip or a square carbide tip embedded in the head in this manner provides a sharp point or edge without the need of grinding the carbide tip, the sharp edge or point being provided by the inclination of the carbide tip in relation to the supporting head in which it is embedded.

DESCRIPTION OF THE PREFERRED EMBODIMENT

Figure 1:
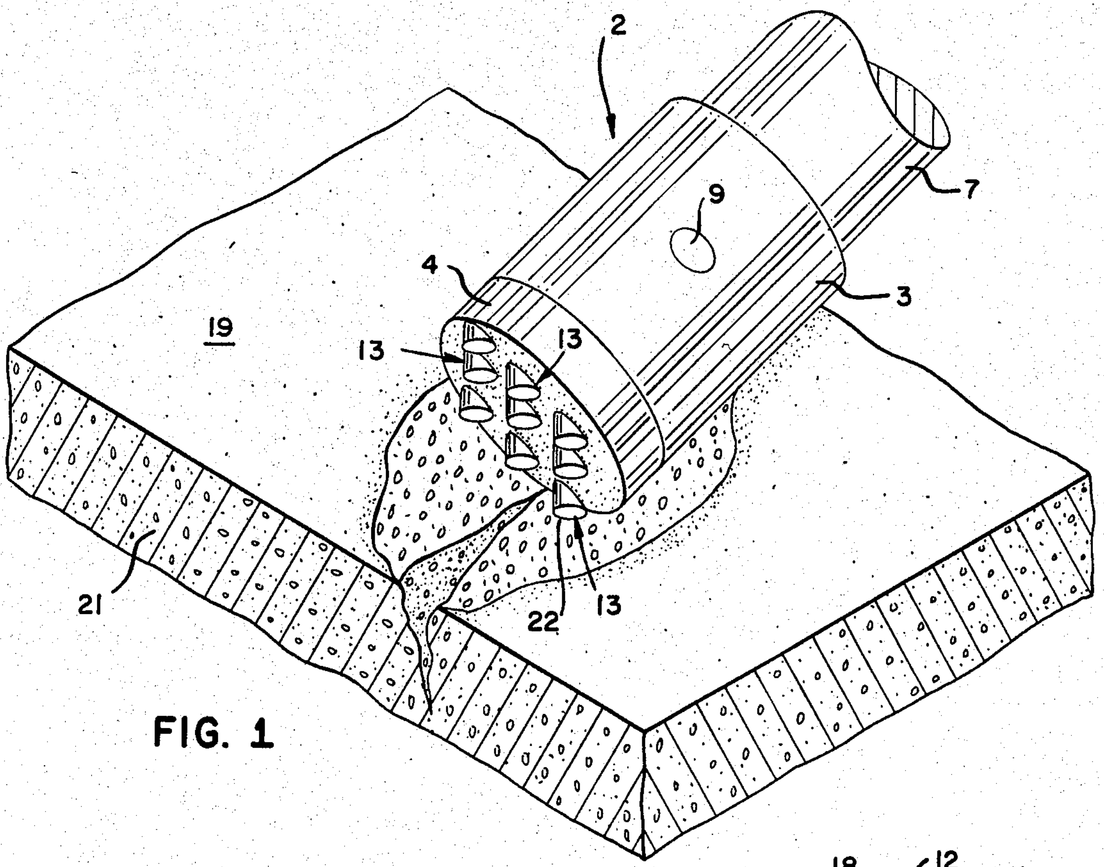
FIG. 1 is a perspective view illustrating a slab of concrete having a crack therein and the tool of the present invention superimposed thereabove.
Figure 6:
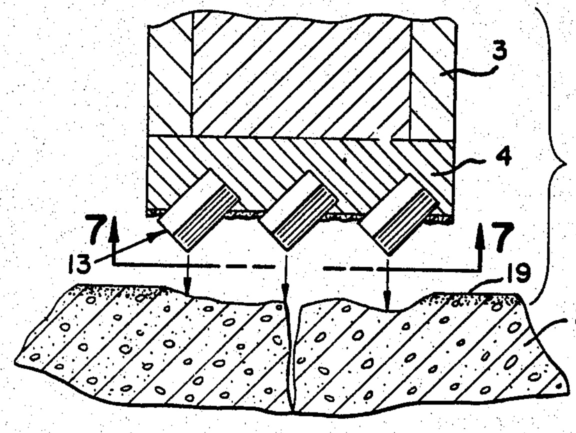
FIG. 6 is a fragmentary vertical cross-sectional view of a portion of the tool illustrating the use of square carbide bar stock to form the pulverizing tips of the tool.
Figure 11:
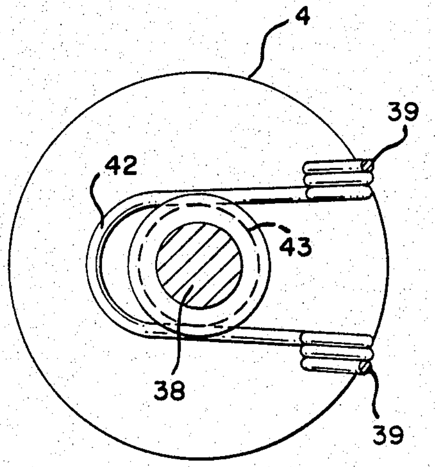
FIG. 11 is a horizontal cross sectional view taken in the plane indicated by the line 11—11 of FIG. 10.

In terms of greater detail, the scarifying tool of the invention comprises a generally cylindrical body designated generally by the numeral 2, having a shank portion 3 and a head portion 4 as illustrated in FIG. 1, shank portion 3 in the embodiment illustrated in FIG. 1 having a central bore 6 adapted to receive the actuating shaft 7 of a drive mechanism designated generally by the numeral 8 in FIG. 11. In the embodiment of the invention illustrated in FIGS. 1, 2 and 3, the shank 3 of the tool is appropriately pinned to the shaft 7 by means of a pin 9 which is preferably press fitted through the actuating shaft 7 and the associated walls of the shank 3. Mounted so as to project from the surface 12 of the head 4 are a plurality of identical carbide cutting tips designated generally by the numeral 13, each of the carbide tips being cylindrical in the embodiment illustrated in FIGS. 1 through 3, and each of the cylindrical carbide tips being symmetrical about a longitudinal axis 14 that is inclined at about 45° to the longitudinal axis 16 of the tool. Such a relationship is shown in FIGS. 2, 4 and 6.

In order to secure the carbide tips 13 in the head 4 of the tool, the head 4 is provided with a multiplicity of bores 17 through its working surface 12. The axis of each bore is inclined to the axis 16 of the tool and is coincident with the axis 14 of the carbide tip to be inserted in each bore. After insertion of a carbide tip in each of the multiplicity of inclined bores formed in the head 4, the carbide tips are silver brazed therein by flooding the surface 12 with a silver braze compound in a layer 18 thereon, a portion of the molten silver braze material being sucked by capillary action into the bore between the carbide tip insert and the walls of the bore to thus securely retain each of the carbide tips firmly brazed in position in the head 4. As illustrated in FIG. 1, application of the tool to a surface 19 of a concrete block 21, and the rapid reciprocation of the tool in such a way that the carbide tips 13 impinge against the top surface 19 of the concrete, effects a destruction of that surface or a "scarifying" of the surface by rupturing the top surface to expose the underlying aggregate.

Figure 2:
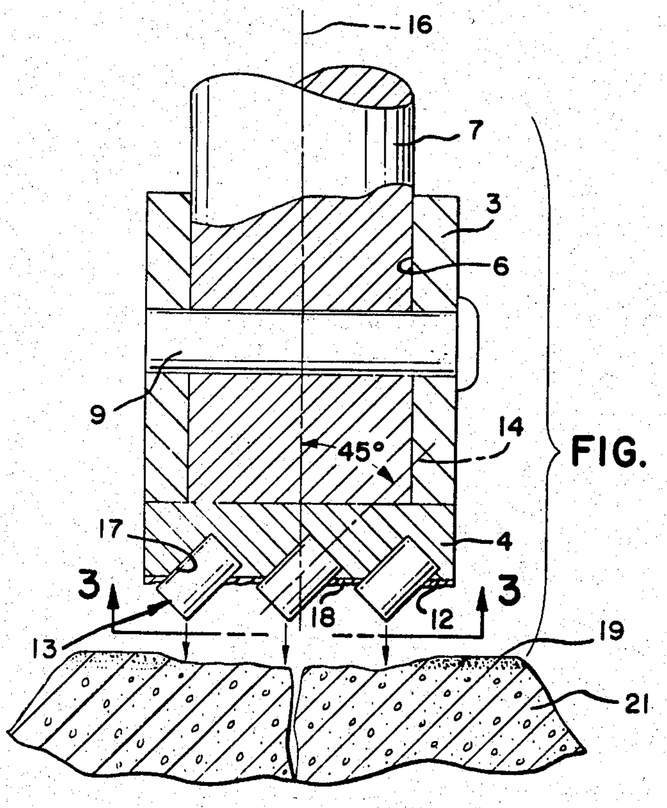
FIG. 2 is a fragmentary cross sectional view through the longitudinal axis of the tool, shown attached to a reciprocable drive shaft which has been broken away to shorten the view.
Figure 3:
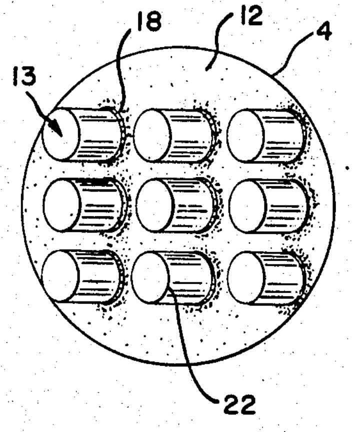
FIG. 3 is a bottom plan view showing the relationship of the carbide tips to the surface of the head in which they are embedded.
Figure 4:
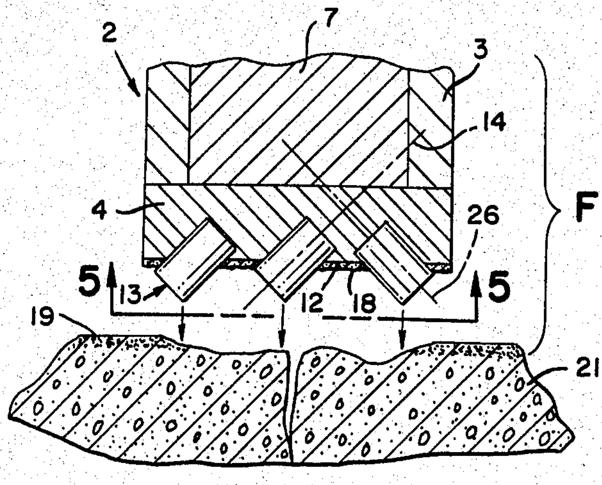
FIG. 4 is a fragmentary vertical cross-sectional view illustrating a portion of the tool with the carbide tips embedded in the head in a different pattern.

It has been found that when the carbide tips 13 are secured in the head 4 in an inclined attitude and pattern as illustrated in FIGS. 1 through 3, each of the carbide tips 13 presents an arcuate edge portion designated in FIG. 3 by the numeral 22 which impinges against the surface 19 of the concrete to effect rupturing thereof. It has also been found that the edge 22 of each of the carbide tips that impinges against the concrete surface, i.e., the first point of impact, is the highest point on each of the carbide tips, with the arcuate edge of the carbide tip on opposite sides of the highest point progressively biting into the surface of the concrete to effect its destruction.

In the embodiment of the invention illustrated in FIG. 3, it will be seen that the carbide tips 13 are all inclined in the same direction, i.e., the axes of the cylindrical carbide tips are parallel, and uniformly inclined in the same direction with respect to the longitudinal axis of the tool. It has been found that with this pattern of carbide tips, the tool may be held vertical to the surface 19 as illustrated in FIG. 2, and because of the uniform inclination of the carbide tips, the tool will "walk" along the crack with very little or no lateral application by force by the operator.

Figure 5:
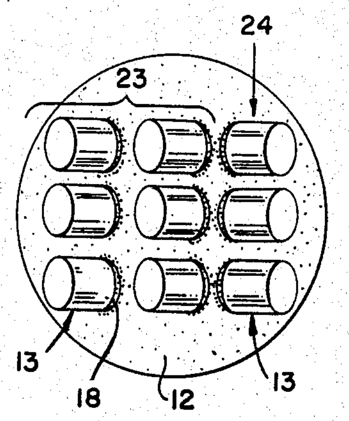
FIG. 5 is a bottom plan view taken in the direction indicated by the arrows on line 5—5 of FIG. 4, and illustrating the different pattern of the carbide tips.

Referring to FIGS. 4 and 5, it is seen in this embodiment that the same construction is utilized and therefore the same reference numbers have been applied as for the embodiment of the invention illustrated in FIGS. 1 through 3. In this embodiment, as illustrated in FIGS. 4 and 5, two rows encompassing six carbide tips are designated by the numeral 23 and these are all inclined in the same direction. The third row of carbide tips, designated generally by the numeral 24, however, are inclined in the opposite direction so that the axes 14 of the carbide tips 13 arranged in the two rows 23 are at right angles to the axes 26 of the carbide tips 13 arranged in row 24. In use, it has been found that this arrangement reduces the tendency of the tool to "walk", thus making this pattern particularly useful for boring holes in concrete as opposed to scarifying the surface of the concrete adjacent to a crack therein.

Figure 7:
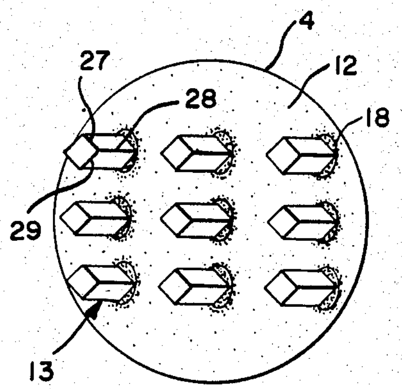
FIG. 7 is a bottom plan view taken in the direction illustrated by the arrows on line 7—7 and illustrating a pattern of placement of carbide bar stock tips that has been found to be successful.

In the embodiment illustrated in FIGS. 6 and 7, the construction of the head is essentially the same as the head illustrated in FIGS. 1 through 3, with the exception that the carbide tips 13 are formed from square carbide bar stock, with the length of each of the carbide tips 13 of square carbide bar stock being longer than its transverse dimension, and with each of the carbide tips being embedded in an appropriate bore. As before, the longitudinal axis of each bore and the carbide tip therein is inclined approximately 45° to the longitudinal axis of the tool. One of the advantages of this embodiment is that the square bar stock provides on each carbide tip three cutting edges 27, 28 and 29 as seen in FIG. 7, so as to increase the efficiency of the cutting action of the head and to increase the life expectancy of the head, thus making use of these heads much more economical. This pattern of carbide tips, as the pattern of FIG. 3, encourages the tool to "walk" over a surface without a lateral force being applied.

Figure 8:
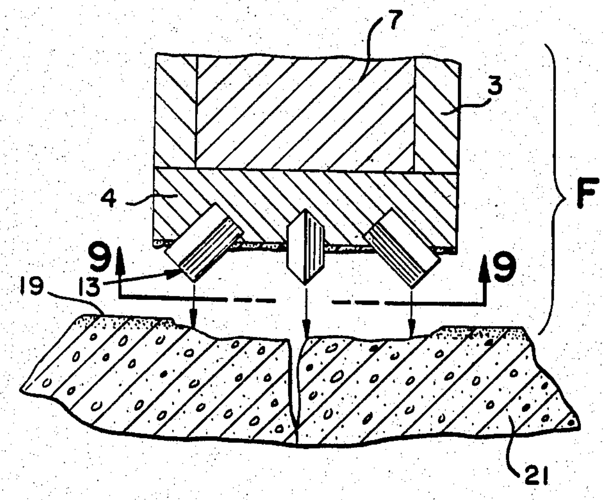
FIG. 8 is a fragmentary vertical cross-sectional view of a portion of the tool, illustrating the use of square carbide bar stock to form the pulverizing tips and arranged in a different configuration.
Figure 9:
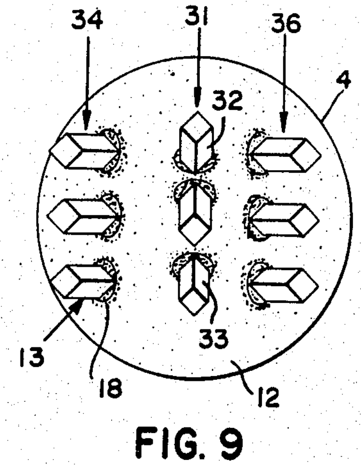
FIG. 9 is a bottom plan view taken in the direction of the arrows on line 9—9 of FIG. 8 and illustrating the different orientation of the carbide bar stock tips.

In the embodiment of the invention illustrated in FIGS. 8 and 9, the structure is the same, with the exception that the pattern of the center row 31 has been modified as illustrated in FIG. 9, with the carbide tips 32 and 33 being inclined in opposite directions toward diametrically opposite peripheral portions of the head 4, while the group 34 of carbide tips are inclined with respect to the longitudinal axis of the tool and with respect to the longitudinal axes of the carbide tips included in the row 31. In like manner, the carbide tips included in row 36 are inclined toward a peripheral portion of the head that is diametrically opposed to the peripheral portion toward which the carbide tips in row 34 are inclined, the carbide tips in rows 34 and 36 each being angularly disposed at about 45° with the longitudinal axis of the tool, and being inclined with respect to each other at approximately 90°. This pattern of carbide tips has been found useful in conjunction with scarifying concrete surfaces, and additionally in the boring of holes through concrete because of the absence of a tendency of the tool to "walk" over the concrete surface.

Figure 10:
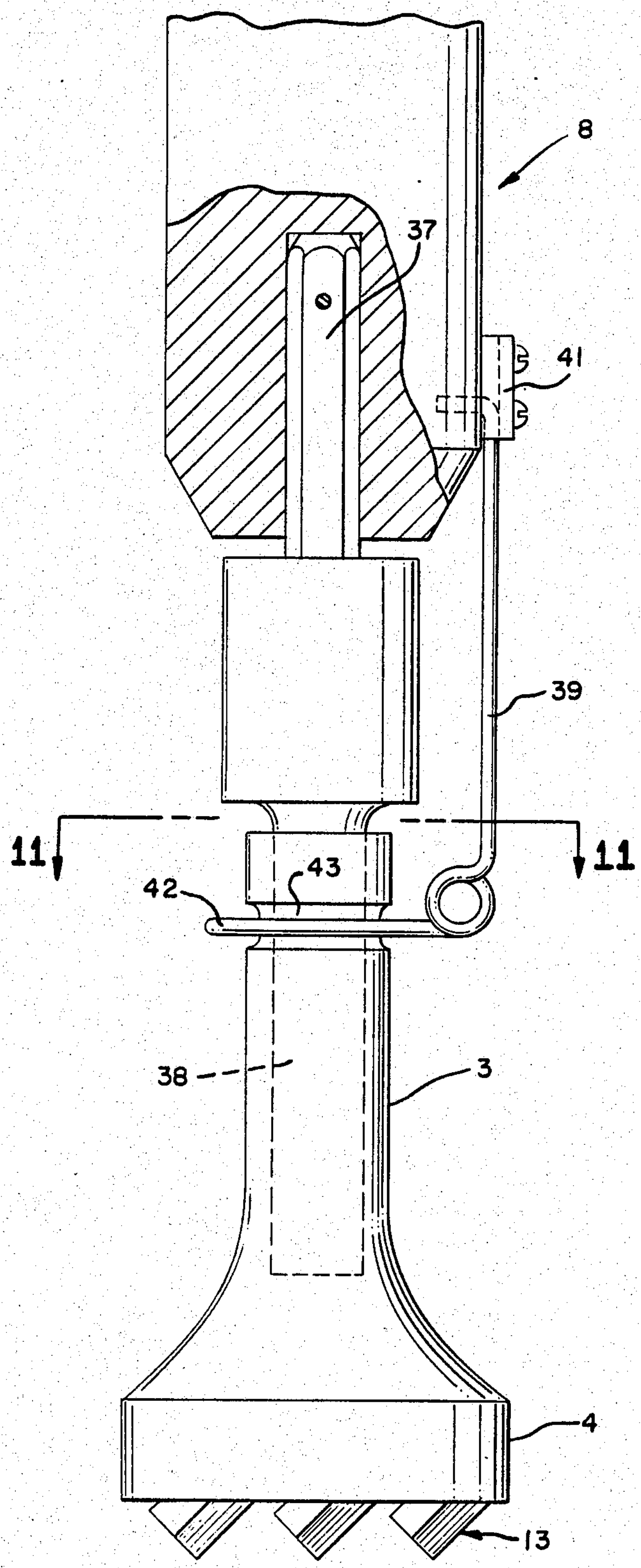
FIG. 10 is a side elevational view of the completed tool mounted on the reciprocable shaft of a drive motor and retained thereon by a spring clip.

Referring to FIGS. 10 and 11, there is there shown a substantially complete assembly, a portion of the driving mechanism 8 being broken away to reduce the length of the figure. As there shown, the driving mechanism 8 is provided with an appropriate chuck in which a shank 37 is caught, the shank being an integral part of the drive shaft 38 that fits down into the bore 6 of the shank 3 as illustrated. In this embodiment, the shank 3 is retained on the operating shaft 38 by a spring clip 39 attached at one end by an appropriate bracket 41 to the side of the driving mechanism 8, and being provided at its opposite end with bifurcated spring fingers 42 adapted to engage resiliently the groove 43 formed in the outer periphery of the shank 3 of the tool. In this embodiment of the invention, the tool head 4 is of substantially larger diameter than the shank 3 but the operation of the device is essentially the same as the embodiment of the invention illustrated in FIGS. 1 through 3.

Having thus described the invention, what is sought to be protected by Letters Patent of the United States is as follows:

1. In a tool for scarifying concrete, said tool comprising a main body having a working face thereon and a plurality of elongated carbide tips each symmetrical about a longitudinal axis and embedded and brazed in bores in said main body at an angle thereto so as to provide a carbide tip portion projecting from the working face thereof at an angle to present a flat end face and at least one edge defined by at least two divergent surfaces, the method of reconditioning the tool after each of said edges has been worn flat from use, consisting of the steps of:

(a) heating the main body to a temperature sufficient to liquify the braze material in each bore surrounding the embedded portion of each elongated carbide tip;

(b) rotating each elongated carbide tip about its own longitudinal axis through an arc of revolution of less than 360° while said braze material is in its liquified state; and (c) causing said main body to cool following rotation of said carbide tips whereby said braze material solidifies to embed and rebraze said carbide tips to said main body.

2. The method according to claim 1, in which each said elongated carbide tip is rotated within the bore within which it is embedded while said braze material is liquified.

3. The method according to claim 1, in which each said elongated carbide tip is repositioned to locate a new tip edge portion axially away from the working face of the main body to the same extent as said at least one edge had extended before use of the tool.

* * * * *